United States Patent [19]

Tanaka

[11] Patent Number: 5,454,026
[45] Date of Patent: Sep. 26, 1995

[54] MOBILE COMMUNICATION CONGESTION CONTROL SYSTEM

[75] Inventor: Shoji Tanaka, Tokyo, Japan

[73] Assignee: NEC Corporation, Japan

[21] Appl. No.: 43,346

[22] Filed: Apr. 6, 1993

[30] Foreign Application Priority Data

Apr. 7, 1992 [JP] Japan .................................. 4-084296

[51] Int. Cl.$^6$ ................................................. H04M 11/00
[52] U.S. Cl. ................................. 379/60; 379/59; 379/58; 455/33.2
[58] Field of Search .................................. 379/58, 59, 60; 455/33.1, 33.2, 54.1, 54.2, 56.1

[56] References Cited

U.S. PATENT DOCUMENTS

| | | | |
|---|---|---|---|
| 4,670,899 | 6/1987 | Brody et al. ............................... | 379/60 |
| 5,042,082 | 8/1991 | Dahlin ..................................... | 379/60 X |
| 5,101,501 | 3/1992 | Gilhousen et al. ..................... | 379/60 X |
| 5,111,535 | 5/1992 | Tokunaga ............................... | 455/33.2 |

*Primary Examiner*—Curtis Kuntz
*Assistant Examiner*—G. J. Oehling

[57] ABSTRACT

A mobile communication system contains a mobile switching center connected to a plurality of base stations constituting a radio service zone and a plurality of mobile stations. The mobile switching center monitors the usage of a traffic channel for each radio service zone and has a usage threshold value for each radio service zone, and informs those to the mobile station via the base station. The busy mobile station compares the traffic channel usage information and the usage threshold value information and the radio zone communicated. When the traffic channel usage is greater than the usage threshold value, the mobile station selects a hand-over radio zone destination based on the received signal strength and quality, and the traffic channel usage information and the usage threshold value information of the adjacent zone, and then transmits a hand-over request designating the hand-over radio zone destination to the mobile switching center.

6 Claims, 4 Drawing Sheets

MOBILE COMMUNICATION CONGESTION CONTROL SYSTEM

BACKGROUND OF THE INVENTION

The present invention relates to a mobile communication congestion control system for controlling mobile-assisted hand-over between radio zones.

In a conventional system for performing congestion control using the usages of traffic channels in a mobile communication system, a mobile switching center has threshold values for the usages of the traffic channels. The mobile switching center compares the traffic channel usage with the usage threshold value and sends a hand-over instruction to a mobile station, as needed.

In a conventional congestion control system, a mobile switching center measures and monitors the channel usage for each radio zone, must select a hand-over destination, and must send a hand-over instruction to a mobile station. Processing in the mobile switching center is complicated and large. As a result, the processing capacity of the mobile switching center is undesirably decreased.

SUMMARY OF THE INVENTION

It is an object of the present invention to provide a mobile communication congestion control system capable of simplifying and reducing the processing in a mobile switching center.

It is another object of the present invention to provide a mobile communication congestion control system capable of increasing the processing capacity of the mobile switching center.

In order to achieve the above objects of the present invention, there is provided a mobile communication congestion control system comprising information transmitting means, arranged in a mobile switching center connected to base stations of a plurality of radio zones constituting a service area, for transmitting traffic channel usage information and usage threshold value information of radio zones to a busy mobile station and an idle mobile station, information receiving means, arranged in the mobile station, for receiving the traffic channel usage information and the usage threshold value information of the radio zone communicated and adjacent radio zones from the information transmitting means, comparing means, arranged in the mobile station, for comparing the traffic channel usage information and the usage threshold value information of the radio zone communicated, which are received by the information receiving means, and selecting means, arranged in the mobile station, for selecting a hand-over radio zone destination based on the level of a received signal strength and quality from the adjacent radio zones and the traffic channel usage information and the usage threshold value information of the adjacent zones which are received by the information receiving means and for transmitting a hand-over request designating the hand-over radio zone destination to the mobile switching center when the traffic channel usage is not less than the usage threshold value of the radio zone communicated.

DESCRIPTION OF THE PREFERRED EMBODIMENTS

Figure 1:
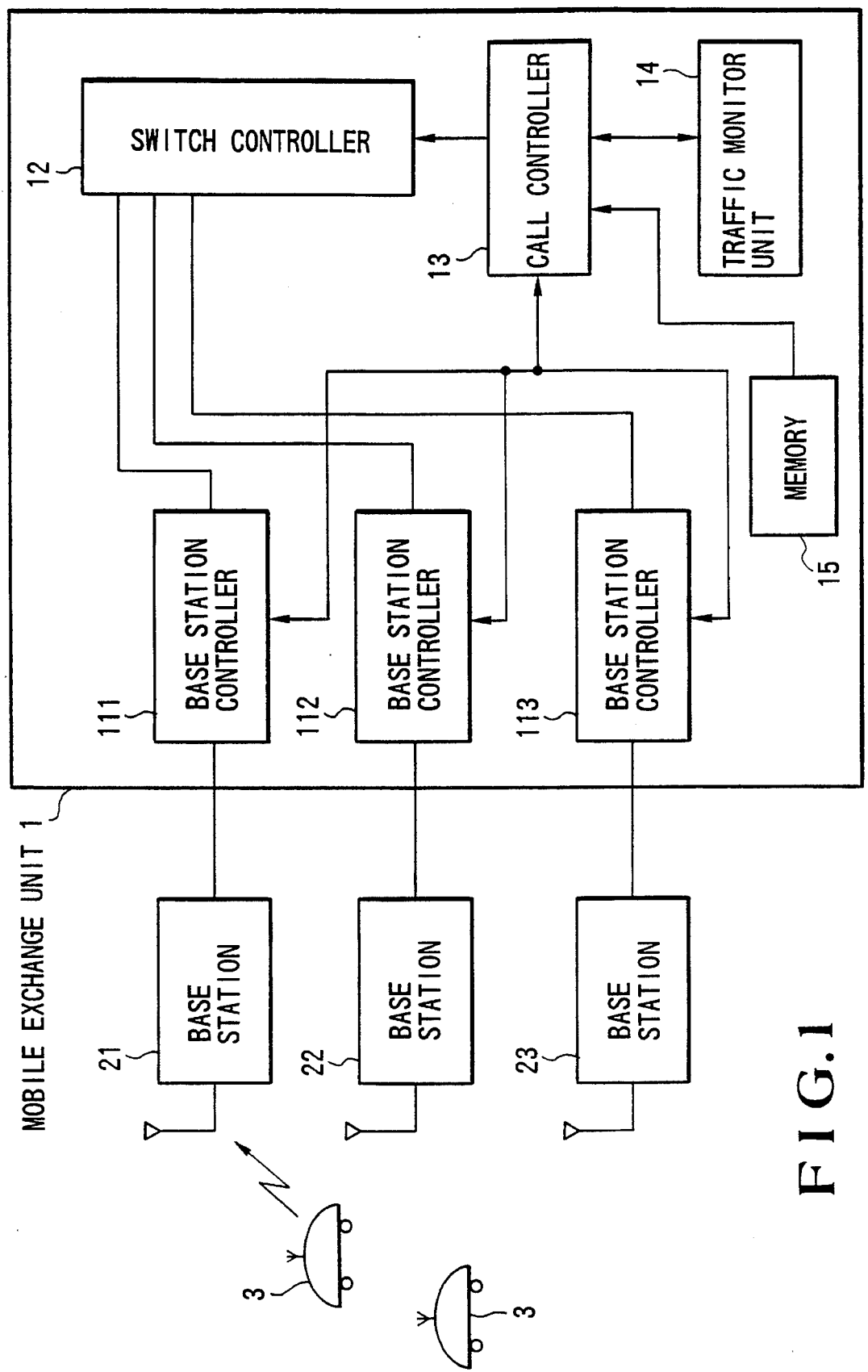
FIG. 1 is a block diagram of a mobile communication system for performing congestion control according to an embodiment of the present invention.

A preferred embodiment of the present invention will be described below with reference to the accompanying drawings. FIG. 1 shows a mobile communication system for performing congestion control of the present invention. This system comprises mobile stations 3 used by mobile subscribers, a mobile switching center 1 for communicating with the mobile station 3 to allow communication between the mobile stations 3 and between a mobile station 3 and a wire subscriber, and base stations 21, 22, and 23 as repeaters, arranged in the respective radio zones, for converting the information such as speech or data communication between the mobile switching center 1 and the mobile station 3 from wire communication to radio communication and vice versa.

The mobile switching center 1 comprises base station controllers 111, 112, and 113 for respectively controlling the base stations 21, 22, and 23, a switch controller 12, connected to the base station controllers 111, 112, and 113, for controlling a traffic channel between the mobile stations 3 or between a mobile station 3 and a wire subscriber, a call controller 13, connected to the switch controller 12, for controlling a call connection between the mobile stations 3 or between a mobile station 3 and a wire subscriber, a traffic monitor unit 14, connected to the call controller 13, for measuring and monitoring a mobile station traffic, and a memory 15, connected to the call controller 13, for storing station data such as frequencies between the mobile stations 3 and the base station controllers 111, 112, and 113, the subscriber number of a mobile station 3, and a usage threshold value.

Figure 2:
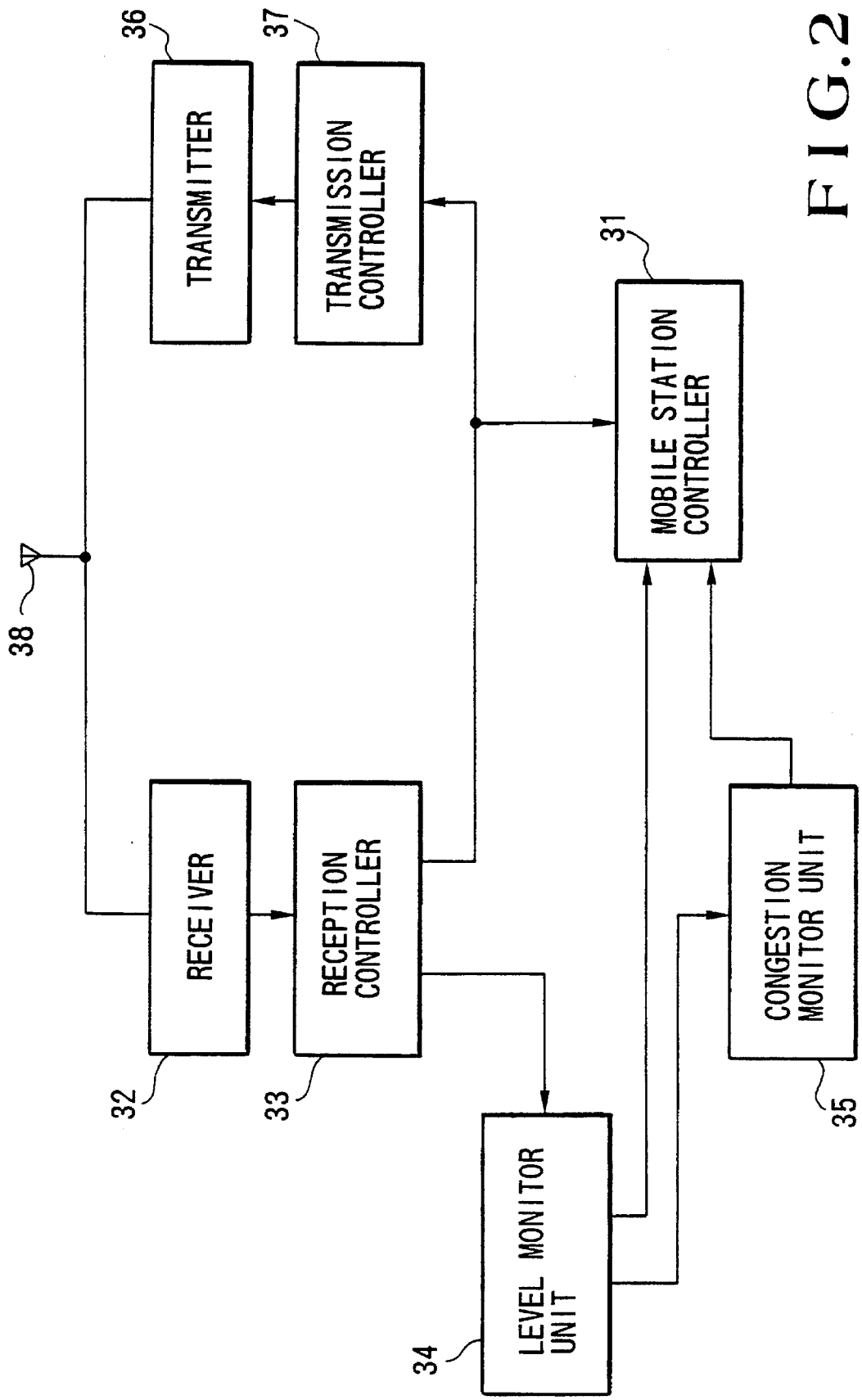
FIG. 2 is a block diagram showing an arrangement of a mobile station in the mobile communication system shown in FIG. 1.

FIG. 2 shows the arrangement of the mobile station 3. The mobile station 3 comprises a mobile station controller 31, a transmitter 36, a transmission controller 37, a receiver 32, a reception controller 33, a level monitor unit 34, and a congestion monitor unit 35. The mobile station controller 31 controls the overall operation of the mobile station 3. The transmitter 36 modulates a carrier wave using control data and a speech signal as modulation signals and transmits the modulated data in air through an antenna 38. The transmission controller 37 controls to repeat the control data and the speech signal which are sent to the mobile switching center 1 and to set the frequency of the transmitter 36. The receiver 32 receives the control data and the speech or data from the mobile switching center 1 through the antenna 38 and demodulates them. The reception controller 33 controls to distribute the control data and the speech or data which are received and demodulated by the receiver 32 and controls the frequency of the receiver 32. The level monitor unit 34 measures and monitors the levels of the received signal strengths (RSSs) from the base stations 21, 22, and 23 and quality levels when the mobile station is set in an idle or busy state. The congestion monitor unit 35 as the feature of the present invention receives traffic channel usage information and the usage threshold value information of radio zones from the mobile switching center 1 and monitors the congestion condition.

An operation of the mobile communication system will be described below. First, an operation for connecting an origination call from the mobile station 3 and then setting a busy state will be described below. The receiver 32 in the mobile station 3 receives system information sent on a control channel from the mobile switching center 1 through the base station 21, and the mobile station controller 31 receives this information through the reception controller 33 and analyzes it. If the received system information is normal, the mobile station controller 31 sets the mobile station 3 in an idle state. In this idle state, when a mobile subscriber operates to request an origination call, the mobile station controller 31 controls the transmission controller 37 by this request. The mobile station unit 31 causes the transmitter 36 to transmit an origination call request signal.

The base station 21 repeats this origination call request signal to the mobile switching center 1. The base station controller 111 in the mobile switching center 1 receives the origination call request signal and outputs it to the call controller 13. Upon reception of the origination call request signal, the call controller 13 analyzes it and hunts an idle channel of the traffic channels accommodated in the base station 21. The call controller 13 causes the base station controller 111 to send out a signal for assigning a hunted idle channel to the mobile station 3, i.e., a traffic channel assignment signal.

The mobile station controller 31 in the mobile station 3 receives the traffic channel assignment signal through the receiver 32 and the reception controller 33 and sends out an instruction to the reception controller 33 so as to cause it to control the receiver 32. The receiver 32 is tuned to the traffic channel designated by the traffic channel assignment signal. The mobile station control unit 31 outputs an instruction to the transmission controller 37 so as to cause that the transmission controller 37 orders the transmitter 36 to transmit a signal representing that the idle channel is assigned and set to the busy state.

In this mobile switching center 1, when the base station controller 111 receives this signal and sends it to the call controller 13. As a result, the call controller 13 controls the switch controller 12 to establish a traffic channel and set a busy state.

The mobile station 3 set in the busy state checks whether hand-over to another radio zone is required due to a deterioration of the signal strength and/or quality level upon movement of the mobile station 3. The level monitoring unit 34 controls the reception controller 33 to monitor the received signal strength (RSS) and quality levels of the currently used traffic channel, and the RSS and quality levels of the control channel of the base stations 22 and 23 installed in the adjacent radio zones. At the same time, the level monitor unit 34 sends the usage and the usage threshold value from the reception controller 33 to the congestion monitor unit 35. Upon monitoring, if the RSS and quality levels of the control channel of the base station 22 are kept at levels to ensure communication quality and higher than those of the traffic channel of the base station 21, the mobile station controller 31 sends a hand-over request designating the base station 22 to the mobile switching center 1 through the base station 21. Another case, if the RSS and quality levels of the control channels of the base stations 22 and 23 are kept at levels to ensure communication quality, these levels, however, are lower than those of the base station 21, and the mobile station controller 31 does not send a hand-over request and keeps communication through the base station 21.

Figure 3:
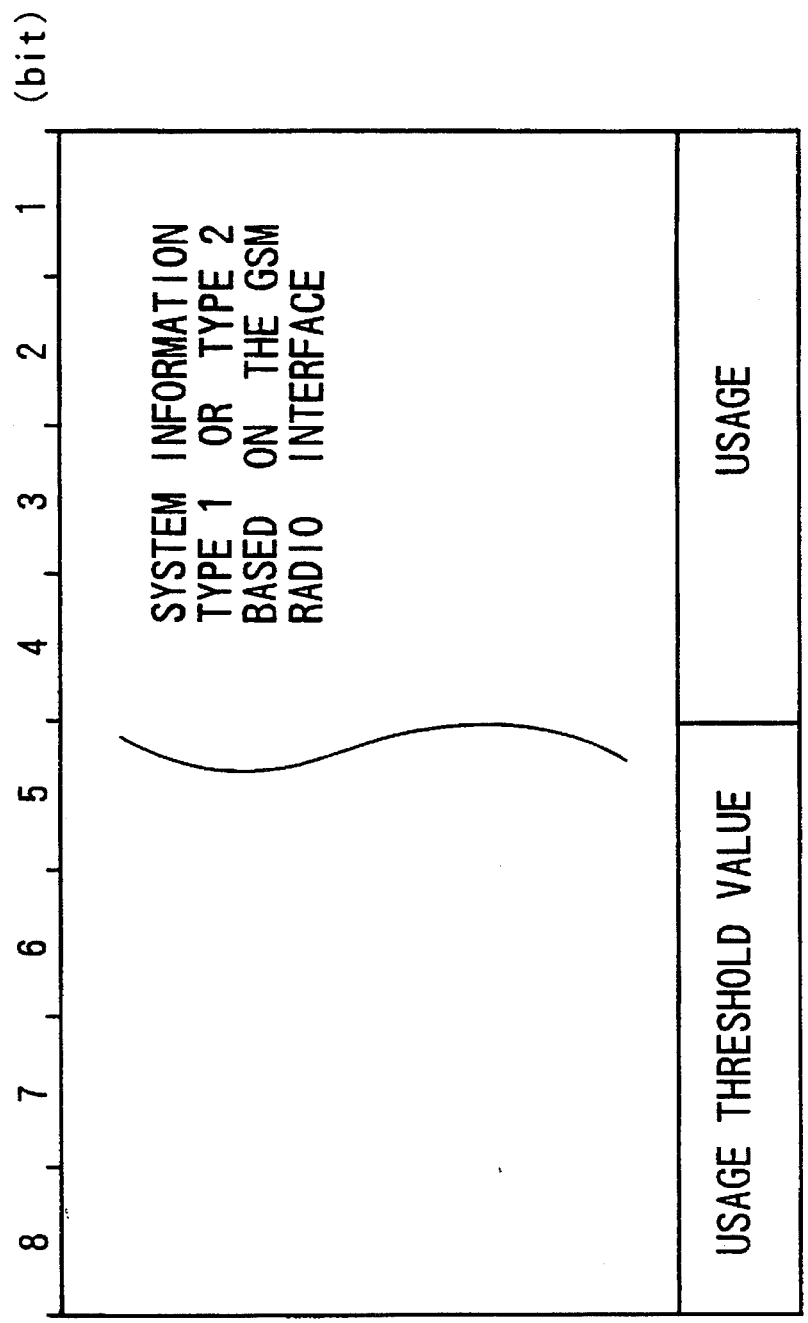
FIG. 3 is a table showing a data format of a traffic channel usage and a usage threshold value.

A congestion control operation as the feature of the present invention will be described below. The call controller 13 of the mobile switching center 1 performs call control and at the same time checks how many mobile stations 3 use the traffic channel. The call controller 13 informs the events that a call setup or disconnection is performed to the traffic monitor unit 14. The traffic monitor unit 14 calculates the traffic channel usage for every radio zone, i.e., base stations 21 to 23 by the information from the call controller 13, and then sends the calculated result to the call controller 13 every predetermined period. The call controller 13 sends the traffic channel usages for every base station from the traffic monitor unit 14 and the traffic channel usage threshold values for every radio zone from the memory 15 to the base station controllers 111, 112, and 113. The base station controllers 111, 112, and 113 send out the traffic channel usages and their threshold values from the call controller 13 to all control channels and all busy traffic channels through the base stations 21, 22, and 23. These data are sent to the busy and idle mobile stations 3 every predetermined period. As a result, the busy mobile stations can receive the traffic channel usages and usage threshold values of the radio zone communicated in addition to the RSS and quality levels of the used traffic channel every predetermined period. In measurements (both the RSS and quality levels) for the control of the adjacent radio zones to perform a hand-over operation, the busy mobile station 3 can receive the usages and usage threshold values of the adjacent radio zones which are informed on the control channels of the adjacent radio zones. This adjacent radio zone information may be informed together with zone information of its own to the mobile station 3. FIG. 3 shows a data format of usages and usage threshold values of 4-bit of traffic channels for sending information on traffic channels and control channels under the conditions:

| Usage: | 0 to 100 | (number of traffic channels used)/(total number of traffic channels in a radio zone) × 100 [%] |
|---|---|---|
| Usage Threshold Value: | 0 to 100 | (number of traffic channels used)/(total number of traffic channels in a radio zone) × 100 [%] |

This embodiment is based on the GSM radio interface. A BCCH (Broadcast Channel) is used as the control channel, and an SACCH (Slow Associated Control Channel) for traffic channel control is used as the traffic channel.

An operation of the mobile station 3 will be described below.

Figure 4:
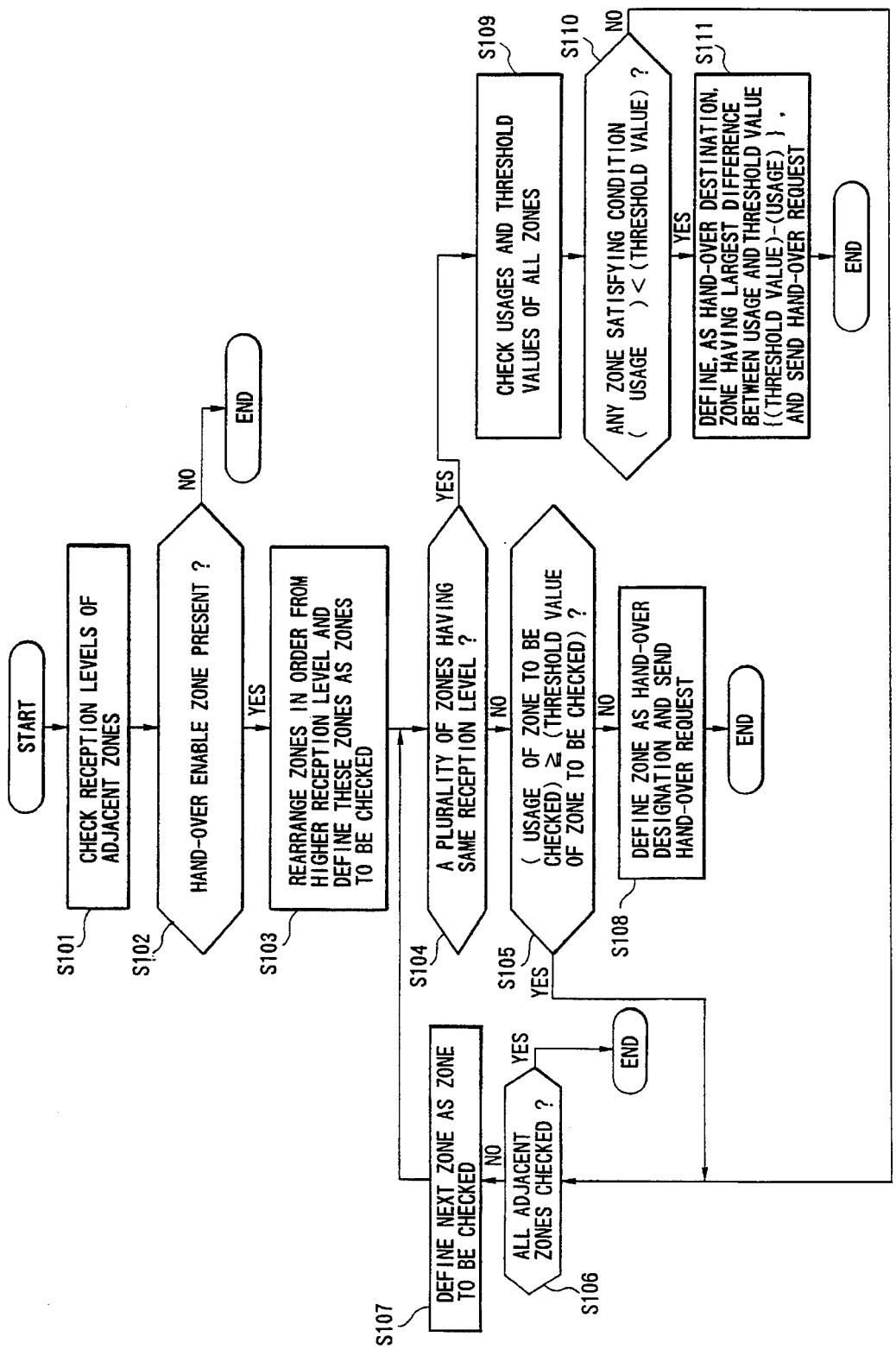
FIG. 4 is a flow chart of congestion control of a mobile station according to the present invention.

FIG. 4 shows congestion control of the mobile station 3 of the present invention. Assume that the traffic channel usages and usage threshold values are informed from the base station controllers 111 to 113 to the mobile station 21 as the following table. Note that the zone of the base station 21 is defined as a zone communicated with the mobile station 3, and that the zones of the base stations 22 and 23 are defined as adjacent zones, and the received signal quality is omitted to simplify the description.

|  |  | Communicated Zone | Adjacent Zone | |
|---|---|---|---|---|
|  |  | Zone of Base Station 21 | Zone of Base Station 22 | Zone of Base Station 23 |
| Time T | Usage | 50% | — | — |
|  | Usage Threshold Value | 80% | — | — |
|  | RSS Level | 60 dBμ | 50 dBμ | 40 dBμ |
| Time $T_1$ | Usage | 85% | 60% | 65% |
|  | Usage Threshold Value | 80% | 70% | 75% |
|  | RSS Level | 55 dBμ | 45 dBμ | 50 dBμ |

When the mobile station 3 is started to communicate with the base station 21 (time T), the usage is less than the threshold value, and the RSS level is greater than those of the adjacent zones. In this case, neither congestion control nor hand-over are performed.

At time $T_1$, the RSS level of the zone of the base station 21 is higher than those of the adjacent zones of the base stations 22 and 23, and hand-over is not performed. However, the usage is more than the threshold value, the congestion monitor unit 35 sends the usages and threshold values of the adjacent zones received and sends them to the mobile station controller 31. The mobile station controller 31 gets the RSS level measurement results of the adjacent zones from the level monitor unit 34. The congestion control operation of the mobile station controller 31 will be continued with reference to a flow chart in FIG. 4 below.

The mobile station controller 31 checks the RSS levels of the adjacent zones (the zones of the base stations 22 and 23 in this case) (step S101) to determine whether a hand-over enable zone is present (step S102). If a condition of a hand-over enable RSS level is defined as 40 dBμ, the zones of the base stations 22 and 23 are hand-over enable zones. All the hand-over enable zones are arranged in an order from a higher RSS level to check a best zone at first (step S103). At first, it is determined whether a plurality of zones having the same RSS level are present (step S104). If NO in step S104, the traffic channel usage of this zone is compared with its usage threshold value to determine whether the usage is equal to or larger than the threshold value (step S105). The RSS levels of the zones to be checked are decreased in an order of the zones of the base stations 23 and 22 (step S103), and the RSS levels of the base stations 22 and 23 are not equal to each other (step S104). So, the zone to be checked is defined as the zone of the base station 23, and its usage and threshold value are checked (step S104). The usage of the zone of the base station 23 is smaller than the threshold value (step S105), so that the zone of the base station 23 is determined as a hand-over zone (step S108). The mobile station controller 31 sends information representing that the zone of the base station 23 is a hand-over destination zone to the transmission controller 37. The transmission controller 37 sends a hand-over request to the mobile switching center 1 through the transmitter 36 and the base station 21.

If the usage of the zone to be checked is equal to or larger than the threshold value in step S105, the zone to be checked is the next zone in the order of RSS levels (step S107). The above operations are repeated until all the adjacent zones are checked (step S106). When the zones to be checked are a plurality of zones having the same RSS level in step S105, the usages of all the zones are compared with the corresponding threshold values (step S109). If a zone having a usage smaller than the corresponding threshold value is present (step S110), a zone having the largest difference between the threshold value and the ((threshold value)—(usage)) is defined as a hand-over destination, thereby sending a hand-over request (step S111). If no zone having a usage smaller than the corresponding threshold value is present, the flow returns to step S104 through steps S106 and S107.

As has been described above, according to the mobile communication congestion control system arranged in the mobile station, mainly a hand-over request is sent to a mobile switching center, and the mobile switching center need not monitor congestion. The processing in the mobile switching center can be simplified and small. The processing capacity of the mobile switching center can thus be increased.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A mobile communication congestion control system comprising:

information transmitting means located in a mobile switching center connected to respective base stations of a plurality of radio zones constituting a service area, the information transmitting means transmitting through said base stations traffic channel usage information and usage threshold value information for each of said plurality of radio zones to busy and idle mobile stations located in said plurality of radio zones;

each said mobile station including:

information receiving means for receiving from said information transmitting means the traffic channel usage information and the usage threshold value information of a first radio zone in which said mobile station is located and of adjacent radio zones;

comparing means for comparing the traffic channel usage information and the usage threshold value information of the first radio zone to monitor a congestion state of the first radio zone;

level monitoring means for measuring and monitoring a level of a received signal strength in a control channel from each of said adjacent radio zones; and selecting and transmitting means for:

(a) selecting one of the adjacent radio zones as a second radio zone to which said mobile station is to be handed-over based on:

(A) the level of the received signal strength in the control channel from the second radio zone being not less than a predetermined hand-over level, and (B) the traffic channel usage of the second radio zone being less than the usage threshold value of the second radio zone, and (b) transmitting a hand-over request designating the second radio zone as a hand-over destination to said mobile switching center when the traffic channel usage of the first radio zone is not less than the usage threshold value of the first radio zone, wherein said selecting and transmitting means selects, as the hand-over destination, one of the adjacent radio zones in which the level of the received signal strength is highest and the traffic channel usage thereof is less than the associated usage threshold value, and when there are a plurality of adjacent radio zones having the same highest level of the received signal strength, said selecting and transmitting means selects, as the hand-over destination, one of the adjacent radio zones having a largest difference obtained by subtracting the traffic channel usage thereof from the associated usage threshold value.

2. A system according to claim 1, wherein said information transmitting means transmits at least the traffic channel usage information and the usage threshold value information of the plurality of radio zones to said mobile stations at every predetermined period of time.

3. A system according to claim 1, wherein said information transmitting means comprises traffic monitor means for measuring and monitoring a mobile station traffic for every radio zone, memory means for storing the usage threshold value information, and control means for transmitting the traffic channel usage information and the usage threshold value information of each radio zone to said mobile station through said base stations in accordance with outputs from said traffic monitor means and said memory means.

4. A system according to claim 1, wherein said selecting and transmitting means selects one of the adjacent radio zones, as the hand-over destination, on the basis of the level of the received signal strength and a level of a received signal quality.

5. A system according to claim 1, wherein the level monitoring means further monitors a level of the received signal strength in a communicating channel of the first radio zone, and said selecting and transmitting means selects one of the adjacent radio zones when the level of the received signal strength of said one of the adjacent radio zones is not less than the predetermined hand-over level and higher than that of the first radio zone.

6. A mobile communication congestion control system comprising:

information transmitting means located in a mobile switching center connected to respective base stations of a plurality of radio zones constituting a service area, the information transmitting means transmitting traffic channel image information and usage threshold value information for each radio zone to busy and idle mobile stations located in said plurality of radio zones;

each said mobile station including:

information receiving means for receiving from said information transmitting means the traffic channel usage information and the usage threshold value information of a first radio zone in which said mobile station is located and of adjacent radio zones;

level monitoring means for measuring and monitoring levels of received signal strengths in a communicating channel of the first radio zone, and in a control channel from each of the adjacent radio zones;

comparing means for comparing the traffic channel usage information and the usage value information of the first radio zone to monitor a congestion state of the first radio zone; and selecting and transmitting means for selecting one of the adjacent radio zones as a second radio zone to which said mobile station is to be handed-over and for transmitting a hand-over request for designating the second radio zone as a hand-over destination to said mobile switching center when the traffic channel usage of the first radio zone is not less than the usage threshold value of the first radio zone, and the level of the received signal strength from the second radio zone is not less than a predetermined hand-over level and higher than that of the first radio zone, wherein said selecting and transmitting means selects, as the hand-over destination, one of the adjacent radio zones in which the level of the received signal strength is highest and the traffic channel usage thereof is less than the associated usage threshold value, and wherein said are plurality of adjacent radio zones having the same highest level of the received signal strength, said selecting and transmitting means selects, as the hand-over destination, one of the adjacent radio zones having a largest difference obtained by subtracting the traffic channel usage thereof from the associated usage threshold value.

* * * * *